US009121922B2

(12) United States Patent
Jarvis et al.

(10) Patent No.: US 9,121,922 B2
(45) Date of Patent: Sep. 1, 2015

(54) ACCESS POINT LOCATION IDENTIFICATION METHODS AND APPARATUS BASED ON ABSOLUTE AND RELATIVE HARVESTING

(75) Inventors: Murray Robert Jarvis, Stapleford (GB); Ben Tarlow, Cottenham (GB); Nicolas Guy Albert Graube, Barrington (GB)

(73) Assignee: Cambridge Silicon Radio Limited, Cambridge (GB)

( * ) Notice: Subject to any disclaimer, the term of this patent is extended or adjusted under 35 U.S.C. 154(b) by 241 days.

(21) Appl. No.: 13/533,349

(22) Filed: Jun. 26, 2012

(65) Prior Publication Data

US 2013/0344886 A1    Dec. 26, 2013

(51) Int. Cl.
*H04W 24/00* (2009.01)
*G01S 5/02* (2010.01)
*G01S 5/00* (2006.01)
*H04W 64/00* (2009.01)
*G01S 19/49* (2010.01)

(52) U.S. Cl.
CPC .............. *G01S 5/02* (2013.01); *G01S 5/0036* (2013.01); *G01S 5/0242* (2013.01); *H04W 64/006* (2013.01); *G01S 19/49* (2013.01)

(58) Field of Classification Search
CPC ....... H04W 64/00; H04W 4/02; H04W 36/03; H04W 36/32; H04L 29/08108; G06Q 10/08; G01S 5/06; G01S 1/02; G01S 5/0252
USPC ............ 455/456.1, 414.1, 456.3, 456.5, 440; 340/539.13; 342/387, 394, 451
See application file for complete search history.

(56) References Cited

U.S. PATENT DOCUMENTS

| | | | |
|---|---|---|---|
| 7,035,650 B1 | 4/2006 | Moskowitz et al. | |
| 8,036,679 B1 * | 10/2011 | Barbeau et al. | 455/456.1 |
| 8,219,116 B1 * | 7/2012 | Ji et al. | 455/456.6 |
| 8,611,247 B2 | 12/2013 | Lakhzouri et al. | |
| 2004/0061646 A1 | 4/2004 | Andrews et al. | |
| 2005/0064879 A1 * | 3/2005 | McAvoy | 455/456.1 |
| 2005/0227703 A1 | 10/2005 | Cheng | |

(Continued)

FOREIGN PATENT DOCUMENTS

| | | |
|---|---|---|
| EP | 2219401 | 8/2010 |
| EP | 2629576 | 8/2013 |

(Continued)

OTHER PUBLICATIONS

"U-TDOA", Wikipedia, the free encyclopedia, http://en.wikipedia.org/wiki/U-TDOA, Jan. 26, 2012.

(Continued)

*Primary Examiner* — Charles Appiah
*Assistant Examiner* — Alexander Yi
(74) *Attorney, Agent, or Firm* — RatnerPrestia

(57) ABSTRACT

A system and method which identifies locations associated with radio-frequency (RF) signal sources in an area, includes receiving multiple measurement sets from a plurality of collector devices. The collector devices obtain contemporaneous information on characteristics of the signal sources and absolute and/or relative location information of the collectors. These measurement sets are processed to discover positioning data for the RF signal sources that may be used to determine locations of devices in the area that are configured to receive or monitor the RF signals.

23 Claims, 6 Drawing Sheets

(56) References Cited

U.S. PATENT DOCUMENTS

| | | |
|---|---|---|
| 2005/0233748 A1* | 10/2005 | Robinson et al. ............. 455/440 |
| 2006/0009235 A1 | 1/2006 | Sheynblat et al. |
| 2006/0217131 A1* | 9/2006 | Alizadeh-Shabdiz et al. ............. 455/456.1 |
| 2007/0001867 A1 | 1/2007 | Rowe et al. |
| 2009/0275344 A1* | 11/2009 | Carlson et al. ............. 455/456.1 |
| 2009/0286551 A1 | 11/2009 | Kennedy et al. |
| 2010/0305863 A1* | 12/2010 | Abubakar et al. ................. 702/7 |
| 2010/0312473 A1* | 12/2010 | Hoshizaki ..................... 701/213 |
| 2011/0043406 A1 | 2/2011 | Duffett-Smith et al. |
| 2011/0059752 A1* | 3/2011 | Garin et al. ................ 455/456.1 |
| 2011/0285591 A1* | 11/2011 | Wong ............................ 342/451 |
| 2012/0028654 A1 | 2/2012 | Gupta et al. |
| 2012/0052883 A1 | 3/2012 | Austin et al. |
| 2012/0142366 A1* | 6/2012 | De Castro Riesco et al. ......................... 455/456.1 |
| 2012/0281584 A1 | 11/2012 | Powers et al. |
| 2013/0017842 A1 | 1/2013 | Gupta et al. |

FOREIGN PATENT DOCUMENTS

| | | |
|---|---|---|
| WO | WO 2005/004528 | 1/2005 |
| WO | WO 2012/035190 | 3/2012 |

OTHER PUBLICATIONS

"E-OTD", Wikipedia, the free encyclopedia, http://en.wikipedia.org/wiki/E-OTD, Apr. 21, 2012.

GB Search Report issued in related GB Application No. 1307922.3, dated Mar. 21, 2014.

Office Action for U.S. Appln. No. 13/606,172, filed Sep. 7, 2012, mailed Feb. 5, 2014.

Office Action for U.S. Appln. No. 13/606,172, filed Sep. 7, 2012, mailed May 15, 2014.

\* cited by examiner

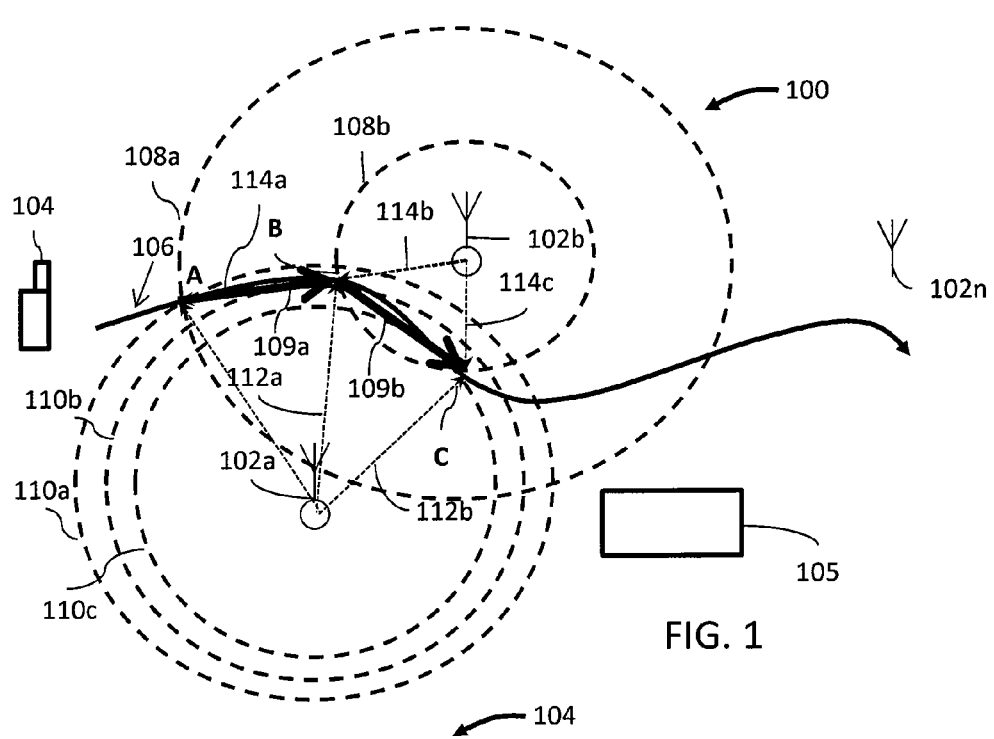
FIG. 1
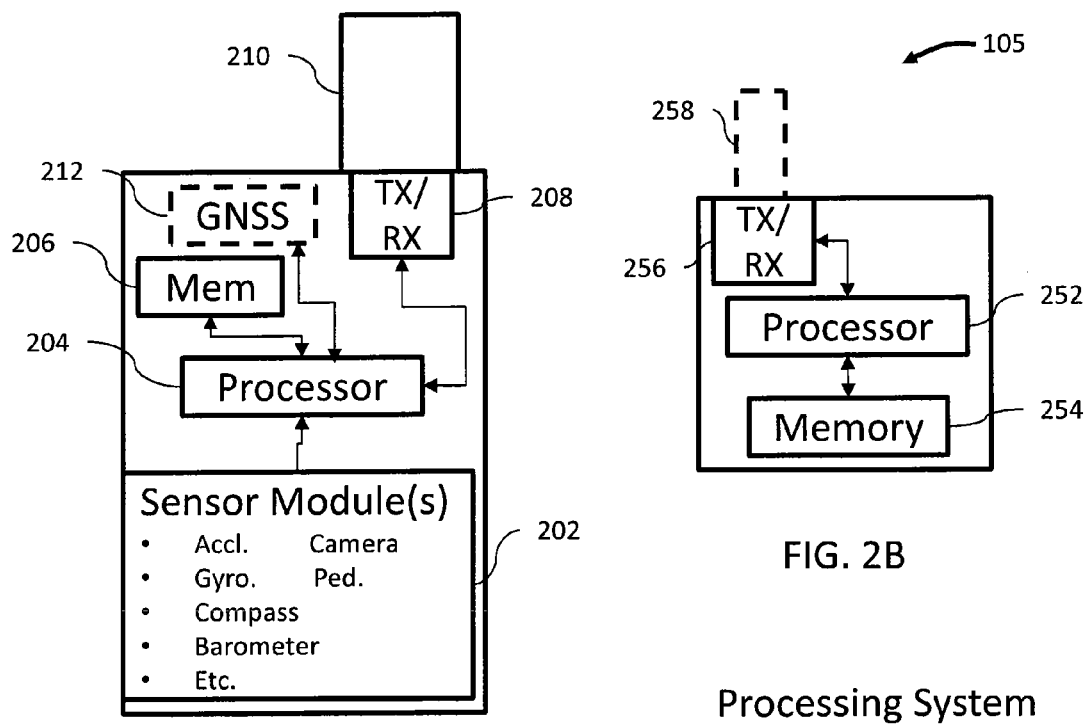
FIG. 2A
Collector Device
FIG. 2B
Processing System

ACCESS POINT LOCATION IDENTIFICATION METHODS AND APPARATUS BASED ON ABSOLUTE AND RELATIVE HARVESTING

The present invention is directed to determining location information from signal sources in a radio-frequency (RF) environment and in particular to a system that determines this information using a combination of positioning data for the signal sources and information about displacement of at least one mobile device.

BACKGROUND

It is desirable to know the physical location or other positioning information about a set of wireless transmitters, referred to herein as "access points" or "RF sources," in a given area to be able to locate mobile devices in the area. Knowing the location of multiple access points in an environment may be useful, for example, to determine the location of a mobile device by triangulation. While the location of access points may be set manually, it may be difficult to determine an exact location, especially in an indoor environment. Furthermore, the access point may be moved, which would require a new location to be set after each move.

SUMMARY OF THE INVENTION

A system and method which identifies locations associated with radio-frequency (RF) signal sources in an area, includes receiving multiple measurement sets from a plurality of collector devices. The collector devices obtain contemporaneous information on characteristics of the signal sources and information on an absolute location and/or relative displacement of the collectors. These measurement sets are processed to discover positioning data for the RF signal sources that may be used to determine locations of devices in the area that are configured to receive or monitor the RF signals.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. This emphasizes that according to common practice, the various features of the drawings are not drawn to scale. On the contrary, the dimensions of the various features are arbitrarily expanded or reduced for clarity. Included in the drawings are the following figures:

FIG. 1 is an illustration depicting one embodiment of a portable communication devices data traveling along a path among access points.

FIG. 2A is a schematic diagram depicting one embodiment of a collector device.

FIG. 2B is a schematic diagram depicting one embodiment of a processing system.

DETAILED DESCRIPTION OF THE INVENTION

Figure 3:
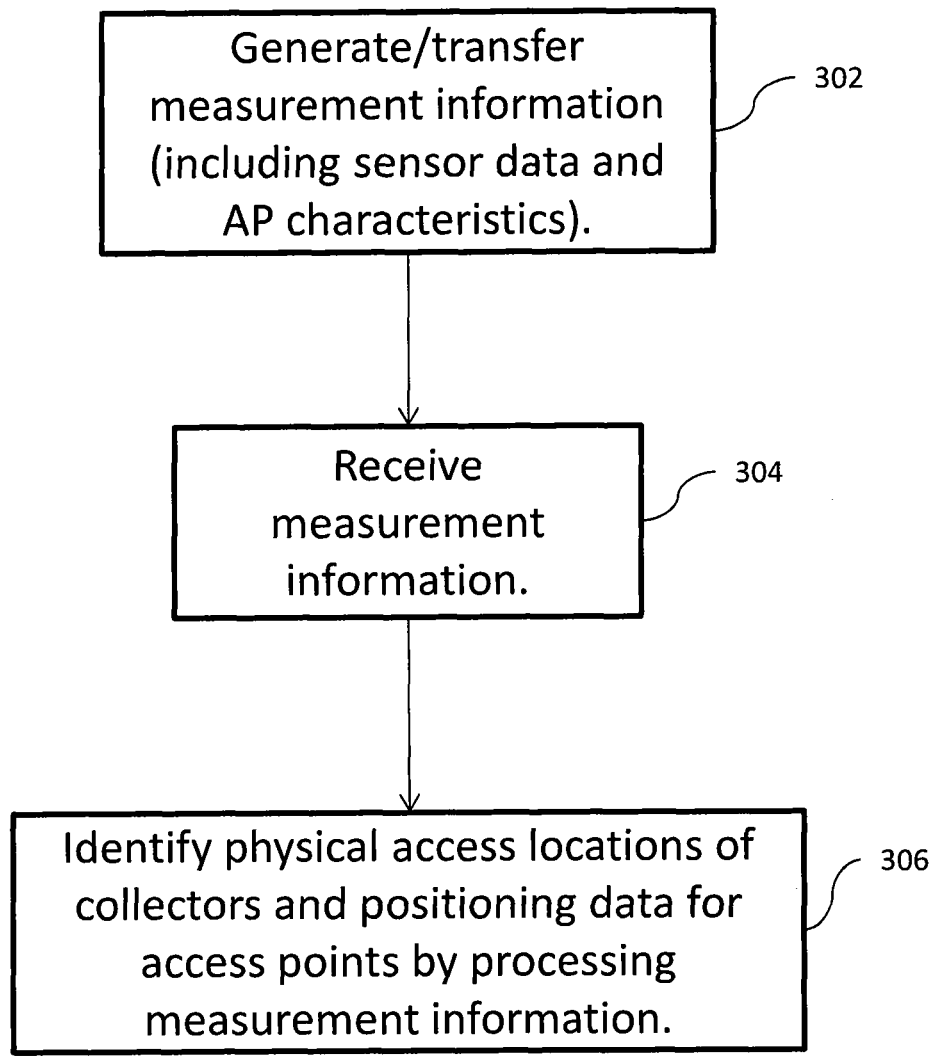
FIG. 3 is a block diagram depicting the high level processes for access point mapping.

Embodiments of the invention overcome the limitation of conventional crowd-sourced learning systems by using absolute and/or relative information derived from automatic or manual crowd-sourced learning methods to obtain positioning data for access points, such as their locations or their fingerprints in an area covered by the access points, that may be used to locate other devices in the area covered. Although the invention is described in terms of an IEEE 802.11 Wi-Fi environment, as used herein, the term "access points" is meant to include any terrestrial RF transmitter or transmitter/receiver of wireless or radio frequency (RF) signals and "wireless transmitter/receiver" is meant to include any transmitter or receiver of wireless or RF signals. The term "position" or "location" information covers any measure of relative or absolute position or location, including without limitation, latitude and longitude, position on a map, or displacement in a polar or Cartesian coordinate system from a predetermined point. Relative location information may be useful because relative positions accurate, absolute positions or locations are frequently unavailable indoors and in areas where GNSS signals are obstructed, weak or non-line-of-sight.

Desirable features will become apparent to one skilled in the art from the description herein and the appended claims. Aspects of the present invention use relative information (e.g., displacement sensor information), to overcome the limitations associated with conventional crowd-sourced learning systems for obtaining positioning data for the access points.

FIG. 1 illustrates a system 100 for determining the physical location of access points 102a-n in accordance with an embodiment of the present invention. The illustrated system includes a plurality of collector devices 104a-n (only one device 104 is shown in FIG. 1) and a processing system 105. The collector devices may be, for example, mobile telephones, IEEE 802.11 devices or receive-only devices that are configured to monitor the RF signals provided by the access points and communicate with the processing system. The processing system 105 may be independent of the access points and may be coupled to the plurality of collector devices by a wireless or wired network. Each collector device 104 generates information related to the access points 102a-n, for example, access point identifier (e.g. media access control identifier (MAC ID)), received signal strength indication (RSSI), time or phase offsets of received signals and/or round-trip delay time (RTT), and transmits the information to the processing system 105. Each collector device may provide sensor data to indicate, for example, a displacement of the collector device 104 along a path from the previous position measurement. The displacement information may be generated by circuitry internal to the collector device, including, without limitation, a Hall-effect or micro electro-mechanical systems (MEMS) magnetometer, a MEMS accelerometer, an optical or MEMS gyroscope, a pedometer or a MEMS barometer. Each collector device 104 may also or alternatively provide information that may be used to determine its absolute location, for example, an image of a barcode indicating location, information from a Global Navigation Satellite System (GNSS), a location obtained by triangulating signals from cell-phone transmitters, or information manually provided by a user such as a position on a map. The processing system 105 processes the information received from the collector devices to determine locations of the collector devices 104 and positioning data for the access points 102.

In one embodiment of the present invention, shown in FIG. 1, an operator possessing a collector device 104 travels along a path 106. The collector device 104 detects access points 102a and 102b. The collector device 104 may, for example, measure signals of different strengths, as indicated by the circles 108a, 108b, 110a 110b and 110c depending on many variables (e.g., distance from mobile device to access point, quality of access point and the presence of obstacles between the access point 102a or 102b and the collector device 104). Each of these circles represents a sphere where the signal characteristics of the access point are substantially equal. It is noted, however, that the contours of the signal characteristic measurements are unlikely to be circular or spherical as illustrated in FIG. 1 due to antenna characteristics, reflections and obstructions, especially in an indoor environment.

The collector device 104 may periodically obtain measurement information with respect to the access points and its immediate environment. The measurement information may include information on the access point 102 (e.g., MAC ID, and signal characteristics such as signal strength, signal quality, signal arrival time, RTT, etc.) The mobile device may also obtain image data and, and signal quality information. These measurements may be made passively, for example by monitoring Wi-Fi beacon transmissions (e.g. a Wi-Fi scan), or actively by sending a "ping" or discovery message that, when received by the access points, causes them to transmit the identification information.

The example collector device 104 may calculate displacement information based on its present and/or previous location. The displacement information and observed signal characteristics of the access points 102 from some collector positions may be combined with absolute location information from other collector positions to determine absolute locations of the access points 102 and collector devices 104 over an area of interest even when absolute location data is not available in the area. Absolute location information may not be available because some of the collector devices 104 may not have the capability to determine absolute location or because they may not be able to use their absolute location determination capability.

In embodiments where the displacement information includes relative information, the displacement information may be obtained through sensor devices as described above. The sensor data may be accumulated and/or filtered in the collector device and sent to the processing system 105 as a measurement set or it may be provided to the processing system 105 as a single displacement vector. It may also be received by the processing system 105 as raw data wherein any filtering and/or accumulation may be performed in the processing system 105. For example, the mobile device may send successive displacement vectors derived from sensor data, for example, a MEMS accelerometer. Each displacement vector may specify a displacement along the x, y and z axes. It is contemplated that the displacement in the z axis may be omitted if altitude data is not needed. The collector devices may also send signal characteristic data for the access points.

If each collector device 104 sends successive displacement vectors as raw data instead of in a measurement set that includes monitored access point signal characteristics at both ends of the displacement, each collector device may need to identify itself to the processing system 105. This may be problematic as, if the collector device is a mobile telephone, the user of the mobile telephone may not want to send both its identity and its position. To avoid this disclosure, the processing system 105 and the collector devices 104 may cooperate to exchange anonymous data allowing processing system 105 only to recombine 104 data without need or means to identify the collector device 104.

It is desirable for the determination of at least the endpoints of measurement set sent by a collector device 104 to be close in time to the determination of the signal characteristics of the access points 102. This allows the displacement data to be associated with the signals received from the access points.

At least one set of measurement information including both signal quality of the access points 102 and displacement of the collector devices 104 is sent by the collector device 104 to the processing unit 105. The measurement set may also include confidence data indicating the expected accuracy of the measurement data. This confidence data may include, for example, an expected accuracy of the displacement data provided by the sensors and of the signal characteristic data from the monitored access points 102. It is contemplated, for example, that strong signal characteristic data may have a higher confidence value than weak data. In the example shown in FIG. 1, the processing system 105 receives, from the collector device 104, three measurement sets, each set including displacement data, signal characteristic data associated with the access points 102a and 102b and confidence data for each of the measurements. In an exemplary embodiment, the processing system 105 may receive many sets of measurement information from many of collector devices 104a-n. The measurement information is processed by the processing system 105, to identify physical locations associated with the collector devices 104a-n and the access points 102a-n.

For example, as shown in FIG. 1, mobile device 104 travelling along path 106 it reaches point A and receives a signal from access point 102a having signal characteristics, for example signal strength, indicated by the arrow 112a and a signal from access point 102b having a strength (arrival time or RTT) indicated by the arrow 114a. In this example, device 104 provides the processing system 105 with an absolute position measurement for point A and data values representing the respective identifiers and signal strengths of the access points 102a and 102b. Device 104 may also provide displacement data from a previous point on the route 106 (not shown) to point A. Device 104 then travels to point B. At point B, it receives signals from access points 102a and 102b having signal characteristics indicated by the arrows 112b and 114b. Device 104 then provides these values and sensor data representing displacement between points A and B, as indicated by the arrow 109a, to processing system 105. Device 104 then travels to point C and provides the processing unit with a measurement set including displacement data represented by the arrow 109b and signal characteristics represented by the arrows 112c and 114c.

Based on the absolute position information obtained when the collector device 104 was at point A, the signal characteristic measurements at points A, B and C and the displacement measurements obtained when the collector device was at points B and C, the processing system 105 can estimate absolute locations for points B and C. Based on these positions, the system 105 can then estimate the positions of access points 102a and 102b by performing respective weighted centroid calculations using the signal characteristic measurements at points A, B and C. Thus, it may obtain an estimate of the relative positions of the access points 102a and 102b. It is noted that, according to one example embodiment, these centroid measurements are not used as the locations of the access points but are merely starting points for a calculation that determines the position more accurately, based on crowd-sourced information. The calculated positions of points A, B and C as well as the centroid positions of access points 102a and 102b are only estimates because, for example, the collectors device 104 may not always have a clear signal path to one or both of the access points 102a and 102b so the signal characteristic at one or more of the points A, B and C may be attenuated. In addition, if RTT or arrival time is used as a signal characteristic, the value calculated by the collector device 104 may be erroneous due to multipath. Furthermore, the sensor data for a particular device may not be properly calibrated. Crowd-sourcing is used as described below, to refine these estimates by combining multiple estimates from multiple mobile devices 104, taken at different times and different locations.

FIG. 2A depicts a collector device 104 in accordance with aspects of the present invention. The example collector device includes at least one sensor module 202, memory 206, processor 204, optional transmitter/receiver 208, optional global navigation satellite system (GNSS) module 212 and antenna 210. The sensor module 202 may include, for example, an accelerometer, a gyroscope, a compass or magnetometer, a barometer, pedometer, a camera and/or other components for determining the movement (e.g., direction and distance) of the collector device 104. Memory 206 is used to store instructions for the processor 204 and data within the collector device 104.

Processor 204 is used by the collector device 104 to process the measurement information that monitored or calculated. In addition, the processor 204 may control other functions of the device 104. For example if the collector device is a mobile telephone, the processor 204 may process audio information transmitted through the communications channels. If the collector device 104 includes the optional GNSS module 212, the processor may also calculate the absolute location of the device 104 based on the raw satellite data. In general, the collector device 104 includes a transmitter/receiver 208 to monitor the signal characteristics of the access points 102 and, in one embodiment of the invention, to transmit and receive communications data and to transmit measurement data sets to the processing system 105. In this example embodiment of the invention, the collector device 104 is a mobile telephone and the processing system 105 is coupled to the mobile communications network. The collector device 104 may transmit or receive this information contemporaneously (e.g., while the device travels the path 106), or at predetermined times or locations along the path 106.

In one embodiment of the invention, the operator possesses at least one collector device 104. As the operator travels upon a path 106, the collector device 104 may use data obtained from its internal sensor module 202 to compute its displacement along the path. In this embodiment, the device 104 calculates its displacement from the last location at which it transmitted a measurement set to its current location. This displacement along with the monitored signal characteristics of the access points 102 at the point and one or more confidence values are transmitted by the collector device 104 to the processing system 105.

FIG. 2B is a schematic illustration 105 depicting one example embodiment of a processing system 105. In this embodiment, the processing system 105 receives measurement information using its transmitter/receiver 256 from the collector devices 104. The transmitter/receiver 256 may be used to receive other messages as well. For example, once position estimates for the access points have been obtained, a collector device 104 may send sensed access point signal characteristic data to the processing system 105 and, in response, receive an estimate of the current position of the device 104 from the system 105.

The processing system 105 includes memory 254 to store information. Although in one embodiment the processing system 105 contains memory 254 for storage of information that is physically located within the processing system 105, this is only one example and is not meant to limit the scope of the claimed invention. The example processing system 105 also contains a processor 252 to process the information received, stored, or transmitted to/from the collector device 104. The example processing system also includes an antenna 258 that aids in the processing system's receiving or transmitting of signals. It is contemplated, however, that the processing system 105 may be implemented without an antenna. In this example, the processing system 105 may be coupled to a wired network to receive data from the collector devices 104 which, in turn, transmit the data either through a separate cellular network or through the network to which the access points 102 are connected, as a server on that network.

In one embodiment of the invention, the processing system 105 obtains identification data and signal characteristic data for the access points 104 from one or more of the collector devices 104. The processing system 105 thereafter determines or refines an estimate of the location of the access points 102a-n by combining the collected signal characteristics associated with the access points 102a-n, the collected displacement data provided by the collection devices 104 and the estimated locations of the collection devices. This computation is done automatically and continuously by the processing system 105 as the measurement sets are provided to it by the collector devices 104. Thus, when one or more access points are moved, the access point mapping provided by the processing system 105 may be continually updated. Using more collector devices in the system results in better estimates of the access point locations.

FIG. 3 is a flow diagram outlining the high level steps used for access point mapping. Block 302 denotes the process performed by the collector device 104 according to one embodiment of the invention. In block 302, the collector device 104 generates measurement data (e.g., signal strength, RTT or arrival time and MAC ID for each access point 102a-n, displacement sensor data and optionally absolute location). This data may be stored by the mobile device 104 for later transmission to the processing system 105 or it may be transmitted to the processing system 105 as it is generated. Block 304 denotes the processing system 105 receiving measurement information from the collector device 104. Block 306 denotes the process of the processing system 105 of identifying access point 102 locations or other positioning data (e.g. fingerprint data) for the access points by processing the measurement information provided by the collector device 104 as well as information provided by other collector devices (not shown in FIG. 1). The access point locations or other information may be used by the processing system 105 or by another server coupled to the Wi-Fi network or to a separate cellular network to determine the locations of the collector devices 104 or other devices that monitor signals provided by the access points 102.

Fingerprint data, which determine characteristics of the radio frequency (RF) environment of a particular position, for example, a position on the path 106 may, for example, take the form of equal signal strength contour lines. These contour lines may be used to determine the location of a device based on the relative strengths of the monitored access point signals without knowing the position of the access point.

Figure 3A:
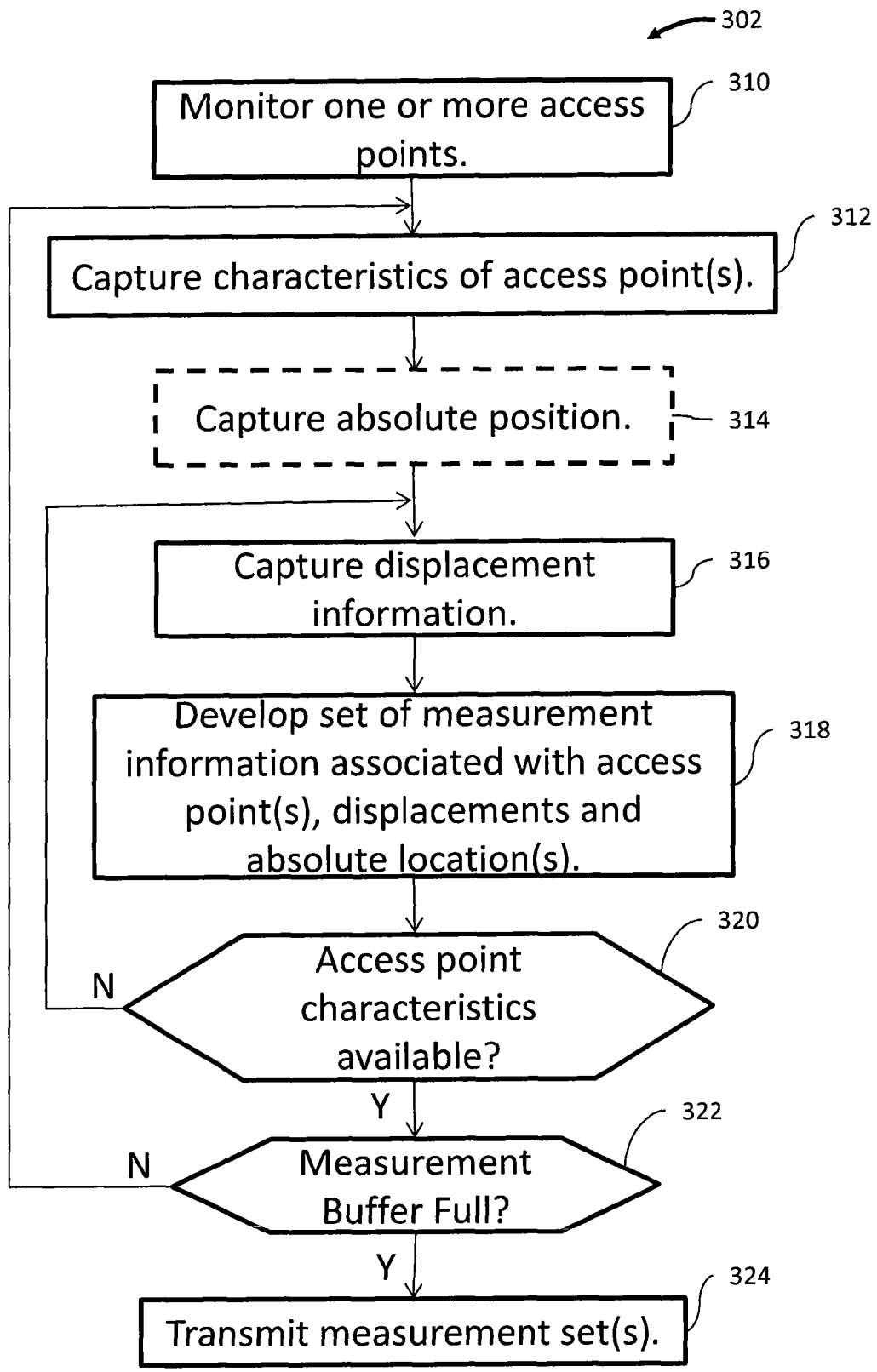
FIG. 3A is a block diagram depicting a more detailed view of a collector device's method of generating/transferring measurement information, as first depicted in FIG. 3.

FIG. 3A is a block diagram 302 depicting a more detailed view of the methods used by the collector device 104 to generate and transfer measurement information. In block 310, the collector device 104 monitors one or more access points 102a-n to retrieve measurement information. As provided in block 312, the collector device 104 captures access point information, and in block 314, if the collector device 104 can determine its absolute location, this information is captured. At step 316, the device captures displacement information. In this example embodiment of the invention, the collector device 104 captures the characteristics of the access points at both ends of a measurement set. Between capturing the access point characteristics, the device 104 captures incremental segments of displacement information.

In block 318, the collector device 104 may add the displacement information captured in step 316 to the current data set. In step 320, it determines if new access point characteristics are available. If they are not, control passes to step 316 to capture another segment of the displacement information. When, at step 320, access point characteristics are available, the collector device 104 determines, at step 322 if the measurement buffer (not shown) is full. The measurement buffer may contained, for example, in the memory 206 of the collector device 104, shown in FIG. 2A. If the buffer is not full, the collector device branches to step 312 to again capture the signal characteristics. If the buffer is full at step 322 and then, at step 324, the collector device transmits the measurement set to the processing system 105.

The measurement set may include multiple displacement segments or a single displacement vector calculated, by the collector device 104, from the multiple segments. Instead of transmitting each measurement set as it is prepared, it is contemplated that the collector device 104 may store multiple measurement sets and transmit them at the same time. After transmitting the measurement set, the collector 104 returns to step 314.

As an alternative to sending two sets of access point characteristics in a single measurement set, the collector device 104 may send a single set, for example, at the end of the measurement set. The processing system may then use the ending characteristics of the last measurement set sent by the particular collector device 104 as the starting characteristics for the current measurement set. This, however, may require each collector to identify itself. As described above, this may be problematic if users of the collector devices do not want to be tracked.

When each measurement set includes signal characteristic data at both ends of the displacement measurement, each measurement set may be independent. Measurement sets may be linked together based on similarity of the signal characteristic measurements.

Block 324 is a process of the collector device 104 that transmits the measurement information to the processing system 105. After transmitting the measurement information sets to the processing system 105, the collector device 104 in block 324 may return to block 314 to obtain the next set of displacement data.

Figure 3B:
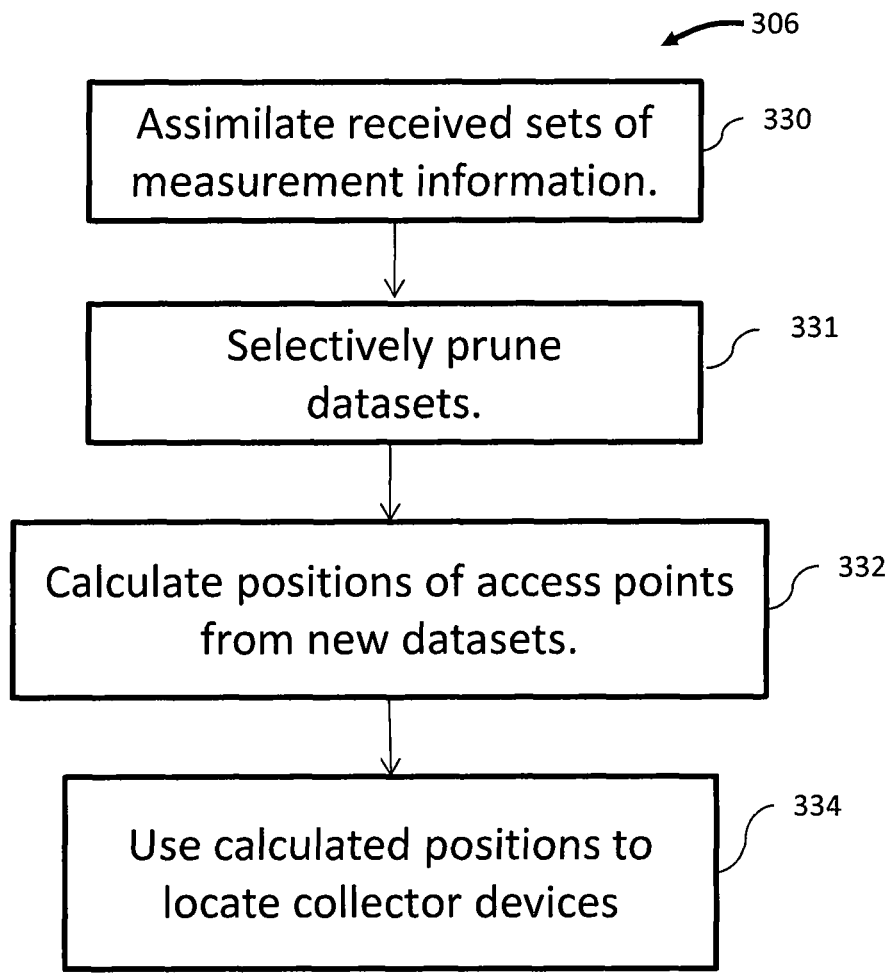
FIG. 3B is a block diagram depicting a more detailed view of a processing system's method of identifying physical access point locations by processing measurement information, as first depicted in block 306 of FIG. 3.

FIG. 3B is a block diagram 306 depicting a more detailed view of one embodiment of a method used by the processing system 105 to generate information about the access points 102a-n that may be used to locate the collector devices 104. This information is generated by processing the measurement sets provided by the collector devices. In block 330, the processing system 105 assimilates one or more of the received measurement sets.

By aggregating a plurality of measurement sets and selectively pruning the measurement sets to retain only the more relevant information, the processing system 105 may achieve a higher quality of the measurement information, which results in a better estimate of the access point's absolute location. The quality of the measurement information may be determined, for example, by the confidence data of the measurement set. This process favours the retention of information from strong access points and also the preserves any chains of relative information that are connected to absolute positions. The process makes no distinction with respect to the temporal ordering of the data. By not making a distinction with respect to the time stamp of the data, the system benefits when GPS fixes are interweaved with relative information. At least one of the measurement sets provided by at least one of the collector devices desirably includes absolute location information.

The next step in the example process may be to determine initial estimated locations of the access points 102. As described above, this absolute location along with the displacement information, may be used to estimate locations along the path 106 at which the access point characteristics were transmitted to the processing system 105. From this information, the processing system 105 can generate weighted centroid estimates of the locations of the respective access points 102.

The processing system 105 may capture data from many collector devices 104 at many different times and from many different locations along the path 106 or more generally in the area covered by the access points 102 and use this information, as described below, to enhance the quality of the position information using crowd-sourcing. During the process of determining the relative or absolute positions of access points 102, the system 105 may selectively discard or discount data sets which violate predefined constraints. In addition, it may selectively discard data sets determined to be outliers or data sets which are of lesser importance.

In block 332, the processing system 105 calculates an estimate of the positioning data for the access points 102a-n using the assimilated sets of measurement information.

By pooling information from all the devices into a single calculation or actually a series of calculations for different geographic areas absolute position information may be related to relative displacement information and the signal characteristics of the access points at various locations into a system of equations that then may be solved using numerical method optimization techniques.

As described above, a standard weighted centroid calculation using only absolute harvested information may be used as a seed. The weighted centroid estimates are not expected to accurately locate the access points 102a-n.

The calculation is localized allowing a relatively small area to be solved for at one time and also to allow for scaling of the system via divide and conquer. One method for selecting the area may be to identify an area of suitable size and then also to incorporate a buffer zone around this that will be included in the calculation. However the result is only taken from the inner areas. Suitable methods for selecting an area are either the use of a quad tree representation (which changes the spatial area depending on the AP density) or to fix the size of the area. A quad tree representation may be used, for example, by setting a maximum number of access points in any area.

When data for a larger number of access points is obtained, the area is split into subareas with the subsets of access points being assigned to their relevant geographic subareas.

Once an area has been identified the data relevant to that area may be brought into the calculation. In the example system, this is achieved by starting from the seed access point locations in the local area determined as described above. The aggregated measurement sets have multiple sets of signal characteristic data for each of the access points Any relative data in which any of these APs occurs is also included in the calculation. This process may be repeated iteratively—successively coupling more and more data into the calculation but at the same time guaranteeing solvability.

In the example embodiment, the access points are Wi-Fi transceivers the signal characteristic of the access points is the received signal strength indicator (RSSI) and the positioning data is the estimated access point location. The problem is formulated as a cost function minimization (which can be mapped to Maximum Likelihood) based on two terms. The first term is a sum over every Wi-Fi observation. This locates the access points 102 in the regions having signal characteristics with high confidence levels. The second term ensures that the estimated true locations where the scans were made do not violate the constraints imposed by the absolute and relative harvesting. It is a sum over all the constraints present. The cost function is shown in Equation (1):

$$E = \Sigma_n (\underline{A}_{i[n]} - \underline{U}_{j[n]})^2 w^2(\text{RSSI}_n) + \Sigma_c (\underline{U}_{k[c]} - \delta_{c,R} \underline{U}_{l[c]} - \Delta_c)^T \Sigma_c^{-1} (\underline{U}_{k[c]} - \delta_{c,R} \underline{U}_{l[c]} - \Delta_c) \quad (1)$$

Where: $\underline{U}$ is the estimated location (e.g. x,y,z vector) at which a scan observation was made (i.e. an estimated location of a collector device 104); $\underline{A}$ is the estimated position of an access point 104; n is a sum over all observations of access points; c is a sum over all constraints (omitted for absolute locations); $\delta_{c,R}$ selects presence or absence of this variable according to whether the constraint is relative or absolute (e.g. Kronecker delta); $\Delta_c$, for absolute constraints, is the measured location and for relative constraint is the measured delta; i[n],j[n],k[c],l[c] are mappings from the observations and constraints to the relevant locations of the access points 102 and points where the collector devices made the observations (i.e. A's and U's); $w^2(\text{RSSI}_n)$ is a weighting for an observation, which may be, for example a function of the signal strength (RSSI) of the monitored access point signal; $\Sigma^{-1}$ is a weighting for a constraint (in the example, this is a 3×3 matrix for each constraint); and T is the transpose of the vector. If RTT or some other measure of signal timing were used as a characteristic of the access points, an additional term may be added to the cost function to accommodate the variation in signal timing.

The above cost function contains three variables for each unknown access point location and three for each unknown collector device position at which a scan was obtained. Typically this is therefore a minimization problem with hundreds, or thousands of unknowns. It is nevertheless tractable as the cost function and gradient are straightforward to calculate.

It is desirable to start the minimization from a good initial point. This may be obtained, for example, using the weighted centroids, described above, to obtain initial estimates of the access point locations and/or by iteratively solving sub-parts of the above problem. Additional outlier rejection checks may be applied at this stage based on the estimated locations obtained from the initial seed calculation.

The example cost function does not use the strictly quadratic (and consequently implied Gaussian) form above but may moderate its form for large errors by changing from quadratic to linear and then constant as the error increases. This process known is known as fat-tailing and flat-tailing.

Uncertainty (equivalently confidence/covariance) in the solution is obtained from the curvature of the cost function at the minimum. The Hessian matrix can be evaluated at the cost function minimum and its inverse yields the covariance matrix. Due to the large number of dimensions this may be an expensive operation. This may be addressed by exploiting the dominantly local nature of the contributors (effectively the sparseness of the matrix) to allow the problem to be split into a series of smaller computationally cheaper calculations, each using a respective portion of the matrix.

Fingerprinting is a method that uses a model of the propagation pattern of each access point 102 to determine the likely location of a collector device 104. If the fingerprint of an access point were used as its positioning data, the model may be initialized with estimated position points in the area and their corresponding signal characteristic measurements. The cost function described above in equation (1) may be modified to minimize differences between the observations and the fingerprint model.

In block 334, the processing system 105 may use the determined locations of the access points 102 to determine the location of a mobile station or other device that is able to monitor the access points 102. As described above, the locations of the access points may change. The process described above does not stop with the minimization of equation (1) and the estimation of the location of the access points 102 but continues to update the locations iteratively.

Figure 4:
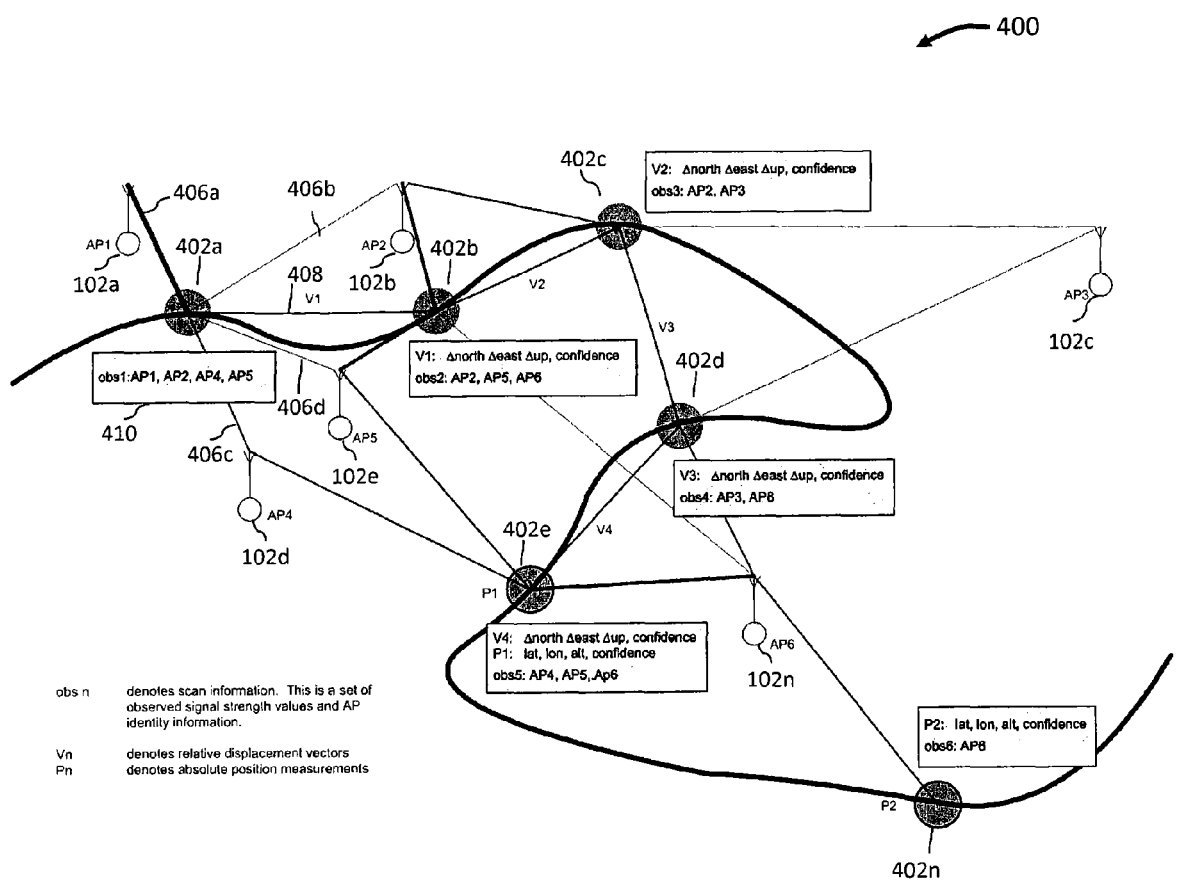
FIG. 4 is a schematic block diagram illustrating a data harvesting operation.

FIG. 4 illustrates the collection of data in an environment 400 including access points 102a-n (AP1-APn). One or more collector devices 402a-n traverse a path 106 through the environment. Each device 402 observes at least one characteristic of each access point 102 within its range (e.g. signal strength, RTT or arrival time) and provides observation data representing this observation and an identifier for the access point to a processing system (not shown) as described above. The characteristics detected by mobile device 402a, for example, are represented by the lines 406 a-d. In the drawing figure, the width of the line indicates the relative value of the characteristic of the monitored signal. In addition, each device 402a-n maintains a list of displacement vectors 408. For the sake of clarity, only one displacement vector is labelled in FIG. 4. In this example, each displacement vector 408 includes displacements along each of the three axes (x, y and z) labelled (ΔEast, ΔNorth and ΔUp) and a confidence value representing an expected error in the displacement vector. The measurement set may also include a confidence value for the observed access point signal characteristics. This may represent, for example, the quality of the signal. Alternatively, confidence data for the access point signals may be based solely on the magnitude of the signals.

In the example embodiment shown in FIG. 4, each collector device 402a-n may provide a single displacement vector, which may be a combination of displacement measurements made along the path 106 between access point observations and a set of access point observations as a measurement set 410. The collector devices 402 may also or alternatively provide absolute locations, indicated as a latitude, longitude, altitude and confidence value in FIG. 4. In this example, each measurement set 410 having a displacement vector includes two observations for each access point 102, one at either end of the displacement vector.

The collector devices 402a-402n shown in FIG. 4 may be a single collector device providing measurement sets 410 to the processing system (not shown) at different times or multiple devices providing the data concurrently or at different times.

The processing system uses the different measurement sets to calculate positions of the access points 102a-n and/or other positioning data for the access points, such as their fingerprints, as described above.

Although approximate positions may be calculated from a small number of data sets, these positions may be erroneous due to unknown or transitory obstructions or features of an access point, such as a highly directional antenna. These obstructions or features may distort the signal characteristic measurements from one or more of the access points causing the received signal to have a different strength, RTT or arrival time, due to attenuation or multipath, than it would have based only on its displacement from the mobile device. In addition, the sensor data provided by a single mobile device may not be properly calibrated, causing errors in the calculated locations, fingerprints or other positioning data for the access points. In order to compensate for any such distortion, the system may collect measurement sets from multiple collector devices 402 at multiple times when the collector devices 402 are in different locations. The locations or fingerprints of the access points 102a-n resulting from these measurement sets may be used to refine the estimated location, fingerprint or other positioning data for each access point.

Figure 5A:
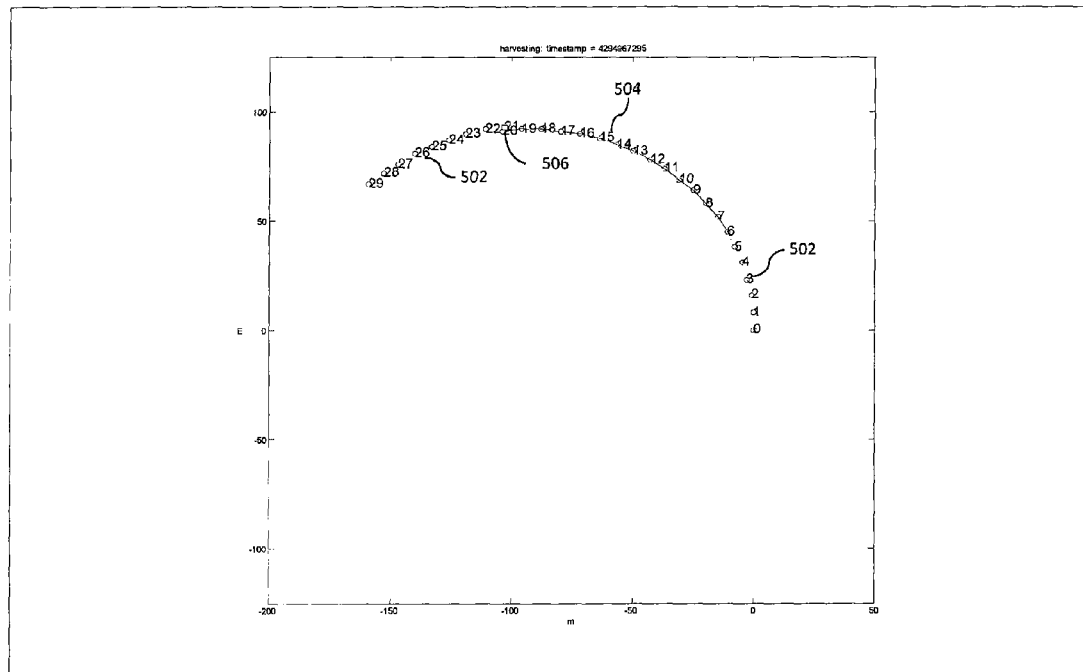
FIGS. 5A and 5B are diagrams showing the data points generated by a mobile device including absolute measurement capability moving along a circular path and the data values it generates.
Figure 5B:
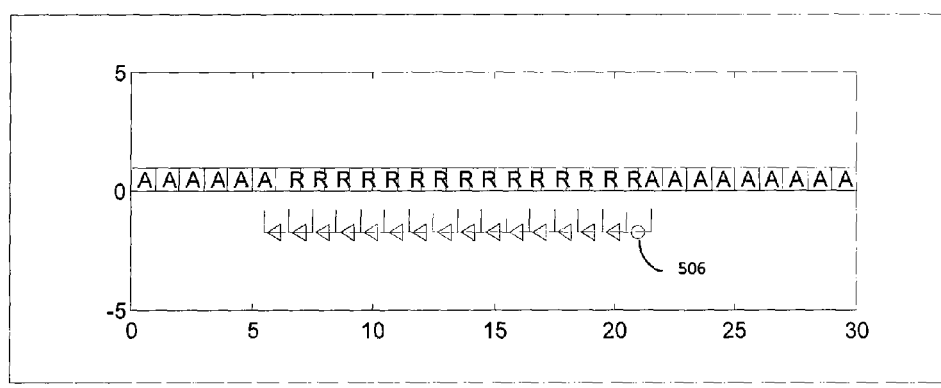

FIG. 5 shows a simulation of relative harvesting with pruning as a mobile device moves in a circular path. It can be seen that the harvesting may provide a large amount of data, filling up the capacity of the memories 206 and 254 of the collector devices 104 and the processing system 105, respectively. The system may selectively discard the less important data (e.g. data with lower confidence values) to provide a set of useful data. The diagram shown in FIG. 5 includes harvesting in the memory 206 or 254 as a set of absolute (A) (e.g. GNSS coordinates) 502 and relative (R) sets 504. Measurement sets 20 and 21 (506) include concurrent relative and absolute data. These sets are particularly valuable and should be retained as they link the relative positioning data to absolute positioning data. The collected data may be pruned by eliminating redundant data. For example, overlapping relative data sets may be redundant and, so, the collected data sets may be pruned using selective decimation which retains one in every n successive data sets. In addition, movement vectors from multiple measurement sets may be combined to provide a single measurement set that represents the motion of the multiple sets.

Although described in terms of an 802.11 environment, the techniques described above may be applied more generally to any RF signature to be used in a mobile environment. For example cellular or low-energy Bluetooth® (BLe) scans may be handled in the same or a similar manner.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for determining respective locations of a plurality of radio frequency (RF) signal sources, the method comprising:

determining initial estimated locations for the plurality of RF signal sources in an area wherein the RF signal sources have at least temporarily fixed locations;

receiving, from a plurality of mobile collector devices, multiple sets of measurement information associated with the plurality of RF signal sources, all of the plurality of RF signal sources having unknown locations, at least one of the received measurement sets including RF signal characteristics and physical displacement information of the mobile collector devices along a path travelled by the respective mobile collector device between respective times at which successive measurements from the respective mobile collector device were received and at least one of the measurement sets from at least one of the mobile collector devices including absolute location information of the at least one mobile collector device; and determining the respective locations of the plurality of RF signal sources by iteratively constraining the respective estimated locations of each of the plurality of RF signal sources to be consistent with the received multiple measurement sets, including the RF signal source information, the physical displacement information and the absolute location information to iteratively generate new estimated locations for the plurality of RF signal sources; wherein the iterative constraining of the respective estimated locations of each of the plurality of RF signal sources includes iteratively minimizing a cost function having a first term that includes a sum of the determined locations of each of the RF sinal sources over all of the sets of measurement information and a second term that includes constraints on the locations of the respective RF signal sources derived from the measurement information to reduce uncertainty in the locations of the RF signal sources.

2. The method of claim 1, wherein the RF signal source information comprises:

an RF signal source identifier;

and at least one RF signal characteristic selected from a group consisting of signal strength, time for a signal to be sent between the RF signal source and the mobile collector device, arrival time of a signal received by the mobile collector device from the RF signal source, or signal quality of the RF signal.

3. The method of claim 1, wherein the displacement information comprises:

relative information associated with motion of each of the respective mobile collector devices.

4. The method of claim 1, wherein the displacement information comprises:

sensed motion associated with each of the respective mobile collector devices.

5. The method of claim 1, wherein the absolute location information includes information from the at least one mobile collector device derived from a global navigation satellite system (GNSS).

6. The method of claim 1, wherein the at least one mobile collector device is a cellular telephone and the absolute location information includes information obtained by triangulating cell phone transmitters.

7. The method of claim 1, wherein the absolute location information includes information manually provided by a user of the at least one mobile collector device.

8. The method of claim 1, wherein the received displacement information includes sensor data from each of the respective mobile collector devices.

9. The method of claim 8, wherein the sensor data is generated using at least one of an micro electrical mechanical system (MEMS) accelerometer, a gyroscope, a pedometer, a magnetometer, or a (MEMS) barometer.

10. The method of claim 8, wherein the sensor data includes a confidence measure.

11. The method of claim 1, wherein the determining step comprises the step of:

assimilating a plurality of the received sets of measurement information associated with the RF signal sources; and calculating respective locations of the RF signal sources based on the assimilated sets of measurement information.

12. The method of claim 1, wherein the calculating step comprises further constraining the cost function with the displacement information.

13. The method of claim 11, further comprising:

discarding, prior to calculating, one or more sets of measurement information based on a determined value of the one or more sets.

14. The method of claim 1, where the plurality of RF signal sources are Wi-Fi access points and the receiving of the multiple sets of measurement information includes receiving signal strength measurements for at least a subset of the plurality of access points, each signal strength measurement being associated with a media access (MAC) layer identifier of the respective access point.

15. The method of claim 1, wherein the respective initial estimated locations include respective location estimates based on centroids for the plurality of RF signal sources.

16. The method of claim 1, wherein the initial estimated locations include estimates derived from fingerprinting data for the plurality of RF signal sources received from the mobile collector devices.

17. A method for collecting information with a mobile collector device for use in estimating respective locations for a plurality of RF signal sources wherein the plurality of RF signal sources have at least temporarily fixed locations in an area and have determined initial estimated locations in the area, the method comprising:

a) capturing, by the mobile collector device, at least one of multiple sets of measurement information associated with the luralit of RF sinal sources includin RF signal characteristics of at least a subset of the plurality of the RF signal sources at a plurality of locations of the mobile collector device, all of the RF signal sources of for which signals are captured having unknown locations;

b) capturing, by the mobile collector device, at least one of the multiple sets of measurement information including physical displacement information associated with motion of the mobile collector device between the respective locations at which the signal characteristics are captured;

c) developing the multiple sets of measurement information including the signal characteristics, information on at least one absolute location for the mobile collector device and the physical displacement information for each of the plurality of locations of the mobile collector device;

d) transmitting the developed measurement sets to a remote location, wherein the respective estimated locations of the plurality of RF signal sources are iteratively constrained to be consistent with the developed measurement sets, including the RF signal source information, the physical displacement information and the absolute location information to iteratively generate new estimated locations for the plurality of RF signal sources; and e) repeating steps a) - d), wherein the iterative constraining of the respective locations of the plurality of RF signal sources includes iterativel minimizin a cost function having a first term that includes a sum of the determined estimated locations of each of the plurality of RF signal sources over all of the sets of measurement information and a second term that includes constraints on the estimated locations of the respective plurality of RF signal sources derived from the measurement information to reduce uncertainty in the estimated locations of the plurality of RF signal sources.

18. The method of claim 17, further comprising:

discarding, prior to transmitting, one or more sets of measurement information based on a determined value of the sets.

19. The method of claim 17, wherein the capturing of the displacement information capture step comprises:

capturing signal characteristics at first and second locations along a path; and capturing motion information between the first and second locations.

20. The method of claim 17, wherein the motion information is generated using at least one of an micro electrical mechanical system (MEMS) accelerometer, a gyroscope, a pedometer, a magnetometer, or a (MEMS) barometer.

21. The method of claim 20, wherein the motion information includes a confidence measure.

22. A processing system configured to perform the steps of claim 1.

23. A mobile collector device configured to perform the steps of claim 17.

* * * * *